United States Patent
Steffens

(10) Patent No.: US 8,161,834 B2
(45) Date of Patent: Apr. 24, 2012

(54) TRANSMISSION WITH POWER TAKE-OFF DRIVE

(75) Inventor: Frank Steffens, Ostfildern (DE)

(73) Assignee: Daimler AG, Stuttgart (DE)

( * ) Notice: Subject to any disclaimer, the term of this patent is extended or adjusted under 35 U.S.C. 154(b) by 82 days.

(21) Appl. No.: 12/800,137

(22) Filed: May 7, 2010

(65) Prior Publication Data

US 2010/0242638 A1    Sep. 30, 2010

Related U.S. Application Data

(63) Continuation-in-part of application No. PCT/EP2008/009331, filed on Nov. 6, 2008.

(30) Foreign Application Priority Data

Nov. 10, 2007  (DE) .......................... 10 2007 053 674

(51) Int. Cl.
*F16H 37/00* (2006.01)

(52) U.S. Cl. ........................................ 74/15.84; 74/331

(58) Field of Classification Search ................. 74/15.84, 74/330, 331, 325, 329, 339, 340, 15.8, 15.82
See application file for complete search history.

(56) References Cited

U.S. PATENT DOCUMENTS

| 4,523,493 A * | 6/1985 | Wei.beta. ...................... 475/205 |
| 5,001,941 A * | 3/1991 | Nemoto ....................... 74/15.63 |
| 5,511,436 A * | 4/1996 | Hasegawa et al. .............. 74/331 |
| 7,730,807 B2 * | 6/2010 | Kim et al. ...................... 74/745 |

FOREIGN PATENT DOCUMENTS

| DE | 1 287 941 | 9/1969 |
| GB | 2 206 852 | 1/1989 |
| WO | WO 2005/058629 | 6/2005 |

* cited by examiner

*Primary Examiner* — William C Joyce
*Assistant Examiner* — Terence Boes
(74) *Attorney, Agent, or Firm* — Klaus J. Bach

(57) ABSTRACT

In a motor vehicle transmission with a power take-off drive, an auxiliary drive clutch in the form of a jaw clutch is arranged in the torque flow downstream of the transmission input clutch for coupling the power take-off drive to the transmission input shaft under the control of the drive motor clutch while the transmission is disconnected.

3 Claims, 2 Drawing Sheets

TRANSMISSION WITH POWER TAKE-OFF DRIVE

This is a Continuation-in-Part application of pending international patent application PCT/EP2008/009331 filed Nov. 6, 2008, and claiming the priority of German patent application 10 2007 053 674.9 filed Nov. 10, 2007.

BACKGROUND OF THE INVENTION

The invention relates to a transmission with a power take-off drive unit.

Transmissions with power take-off drives are used in utility vehicles, where the drive motor not only serves for driving the vehicle, but also for driving additional assemblies. These additional assemblies can be assemblies used during the drive operation, but also assemblies which are used independently of the drive operation. In the area of utility vehicles there are for example building material transport vehicles, where the drive motor is also used to drive a building material pump, for example a concrete pump. Drilling devices of prospecting vehicles or hydraulic assemblies and generators may also be driven as additional assemblies by the drive motor of a utility vehicle.

Transmissions with power take-off conventionally provide the desired performance via a power take-off transmission with an auxiliary drive shaft which is a part of the power take-off transmission.

A transmission with a power take-off as produced by the assignee of this application, on which the present invention is based, has, in addition to an input shaft to which the flywheel of a drive motor is connected, an intermediate shaft, a shift transmission shaft, a power take-off transmission shaft, a transmission input clutch, an intermediate clutch and a power take-off transmission clutch. Via this transmission, the intermediate shaft is connected to the input shaft via a transmission input clutch, wherein this transmission input clutch is also the drive clutch. Further, in this transmission, the shift transmission shaft is connected to the intermediate shaft via an intermediate clutch.

To facilitate connecting the power take-off transmission shaft, the power take-off transmission clutch is a synchronizing clutch, in particular, a multi-disk clutch, whereby the power take-off transmission engages a shaft which is permanently drive-connected to the input shaft. Especially if the full power of the drive motor is to be taken up by the power take-off drive shaft, high demands are made of the power take-off transmission clutch, so that a transmission with such a power take-off drive is quite expensive.

DE 1287941 discloses a variable speed transmission of a range-change transmission type with a power take-off drive for agricultural tractors, in which the power take-off drive is driven by an output shaft of the variable speed transmission. The variable speed transmission can not be disconnected during stand-still periods of the tractor to permit operation of the auxiliary drive independently of the drive operation of tractor in order to make a transmission input clutch of the variable speed transmission available for operation with the auxiliary power take-off drive.

It is the object of the present invention to reduce the expenditures for the manufacture of a transmission with a power take-off drive.

SUMMARY OF THE INVENTION

In a motor vehicle transmission with a power take-off drive, an auxiliary drive clutch in the form of a jaw clutch is arranged in the torque flow downstream of the transmission input clutch for coupling the power take-off drive to the transmission input shaft under the control of the drive motor clutch while the transmission is disconnected.

The arrangement thereby permits shifting—also under load—using the transmission input clutch. The power take-off drive clutch is in the form of a jaw clutch, by means of which a shaft can be directly connected to the intermediate shaft, wherein the shaft serves for supporting or fixing an input element of the power take-off drive. Such an arrangement is not only extremely simple, but it also has very little wear.

The power take-off drive clutch is preferably a non-synchronizing clutch which further reduces expenses for the production of a transmission with power take-off drive.

According to a preferred embodiment of the invention, the transmission has an independent jaw clutch, by means of which it is possible to disengage the input clutch and the intermediate shaft from the load of the power take-off drive after starting the power take-off operation upon drive, whereupon these components can again be used for the vehicle drive operation. The independent jaw clutch cooperates with an input clutch auxiliary shaft.

In a particularly simple and thus also cost-effective construction of a transmission according to the invention—as provided according to a further preferred arrangement of the invention—the power take-off drive clutch has a three-position jaw clutch, in which the functions of a start-up jaw clutch and disconnect jaw clutch are combined.

The advantages of the invention can also be achieved by a conversion of present transmissions, if an auxiliary drive adapter is installed according to a further aspect of the invention, where a power take-off drive clutch is provided in, or at, an adapter housing receiving a power take-off drive gearing, which power take-off drive clutch is arranged in the torque flow downstream of the transmission input clutch. The advantages resulting thereby are the same as with the transmission according to the invention, so that protection is also claimed for such an auxiliary drive adapter.

The invention and advantageous arrangements and further developments thereof will become more readily apparent and from the following description with reference to the accompanying drawings.

DETAILED DESCRIPTION OF PARTICULAR EMBODIMENTS

Figure 1:
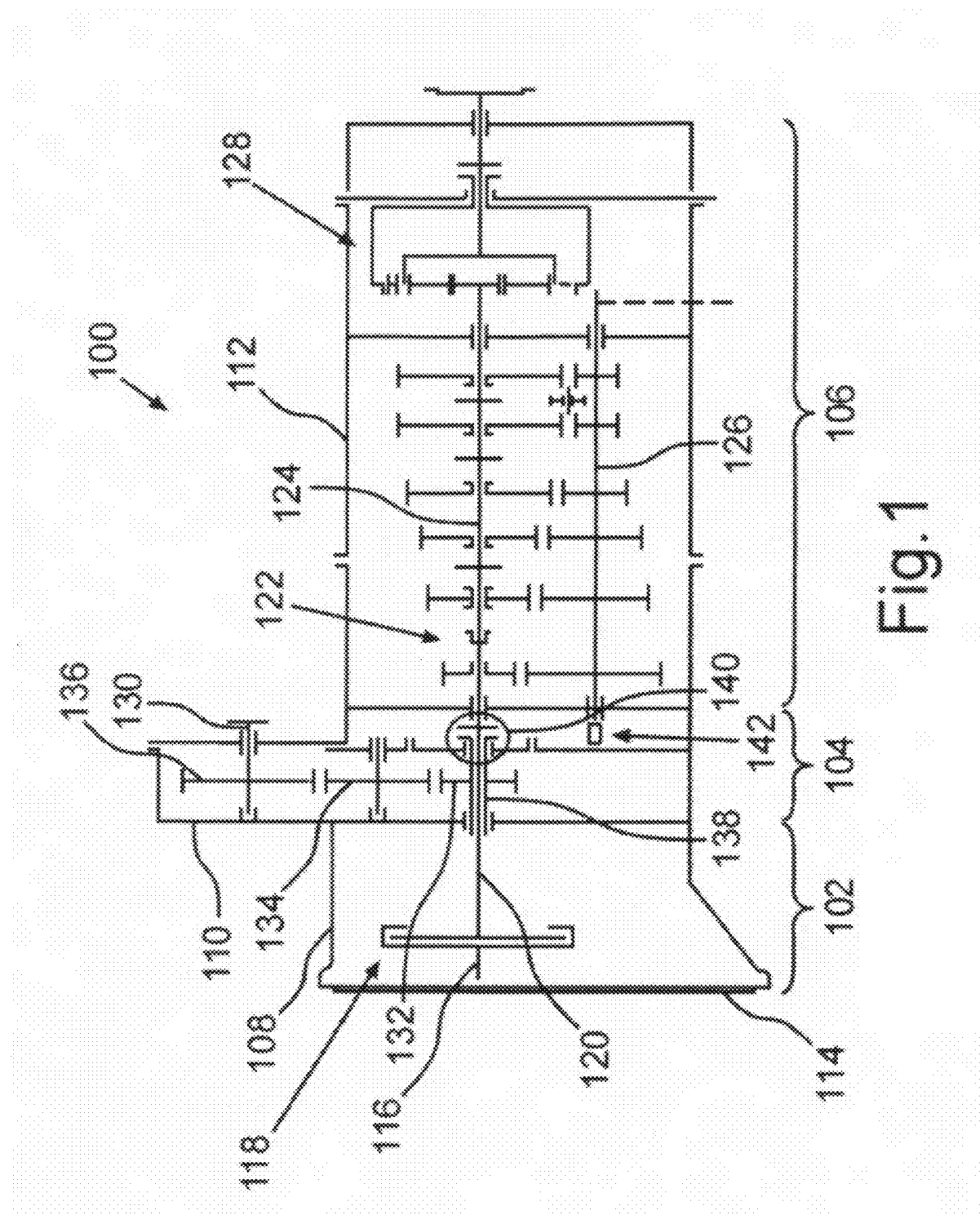
FIG. 1 shows a first preferred embodiment of a transmission with a power take-off drive according to the invention and FIG. 2 shows a second preferred embodiment of a transmission with a power take-off drive according to the invention.

The first preferred embodiment of a transmission 100 with a power take-off drive as shown in FIG. 1 comprises an input clutch section 102, a power take-off drive adapter 104 and a shift transmission section 106. Housing sections, namely an input section 108, and adapter section 110 and a shift transmission section 112 correspond to these sections.

In the installed state, the transmission 100 is flanged to a drive machine (not shown) with its input housing section 108, which has a clutch flange 114 in such a manner that an input shaft 116 of the transmission 100 is connected to the flywheel of the drive motor. A transmission input clutch 118 is arranged downstream of the input shaft 116, by means of which clutch 118 an intermediate shaft 120 can be connected to the input shaft 116.

The intermediate shaft 120, which engages the transmission input clutch 118, extends through the housing input section 102 and the power take-off drive adapter 104 into the shift transmission housing section 106, in which an intermediate clutch 122 is arranged. The intermediate shaft 120 can be connected to a shift transmission shaft 124 by means of the intermediate clutch 122. The shift transmission part 106 has a countershaft 126 and a range group 128 in addition to the shift transmission shaft 124, wherein the shift transmission part 106 is however designed in a conventional manner.

The power take-off drive adapter 104 serves for transmitting power to a power take-off drive shaft 130, which is arranged in a laterally offset manner to the input shaft 116, the intermediate shaft 120 arranged coaxially therewith and the shift transmission shaft 124 which is also coaxially arranged therewith. The power take-off drive shaft 130 is preferably inclined by 3° to the above-mentioned shafts.

A gear drive with an input gear 132, an intermediate gear 134 and an output gear 136 is provided for driving the power take-off drive shaft 130. The output gear 136 is thereby arranged in a torque-proof manner on the power take-off output shaft 130, and the input gear 132 is mounted on a hollow shaft 138, which is supported rotatably on the intermediate shaft 120.

In order to drive the hollow shaft 138 and thus the power take-off drive shaft 130 via the gear drive, a power take-off drive clutch 140 is provided, which is in the form of a jaw clutch.

If an additional assembly is to be driven by the transmission 100 via the power take-off drive shaft 130 as shown in FIG. 1, the transmission input clutch 118 is first disengaged with an open intermediate clutch 122. The intermediate shaft 120 is thereby disconnected, and thus can be brought to a standstill by a countershaft brake 142. In this state it is possible without problem to engage the power take-off drive clutch 140. Subsequently to an engagement of the power take-off drive clutch 140, the transmission input clutch 118 can be engaged, whereby the full power of the drive motor is available at the power take-off drive shaft 130.

Figure 2:
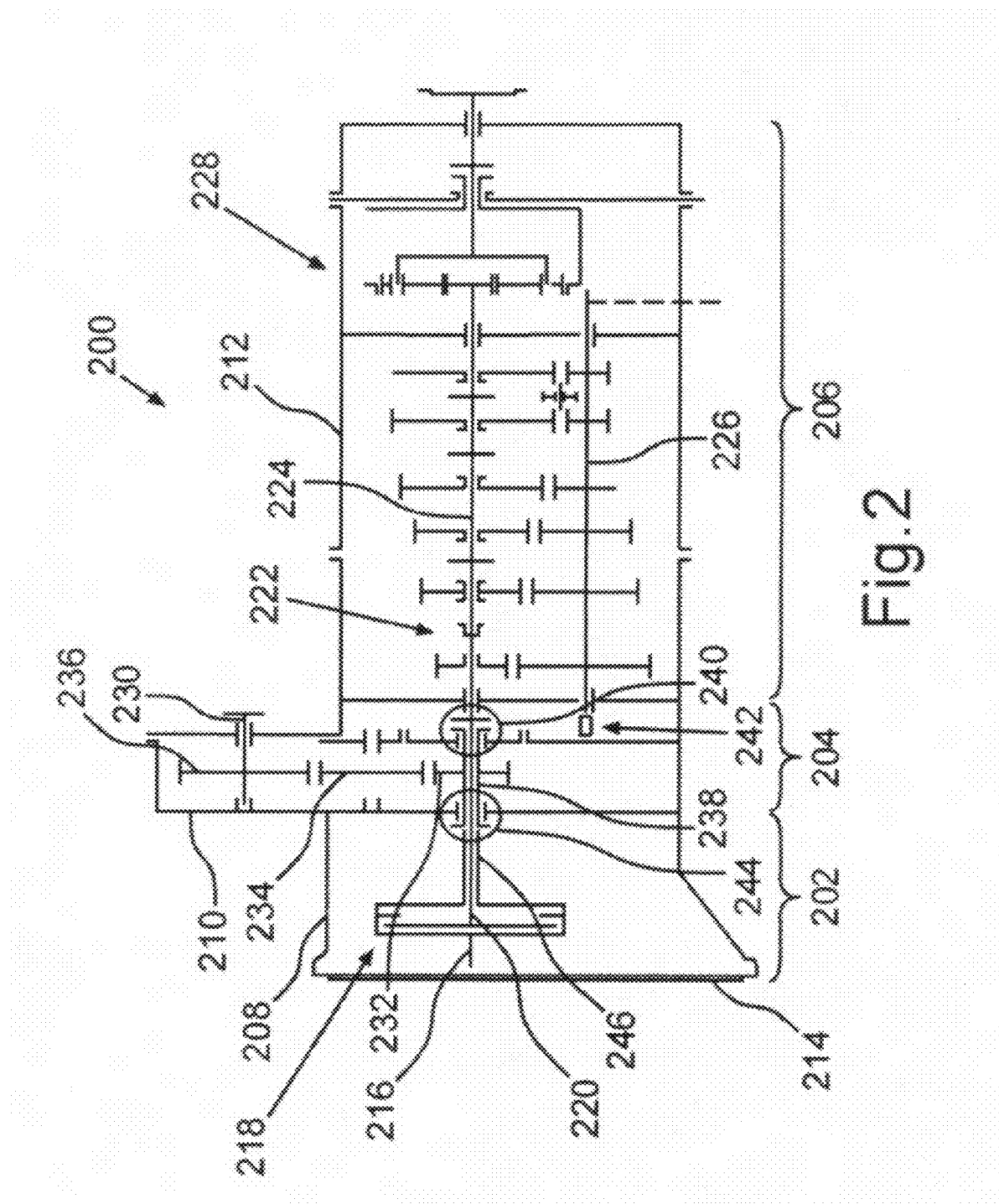

The second preferred embodiment shown in FIG. 2 of a transmission 200 with a power take-off drive according to the invention includes essentially the same elements as the first embodiment, so that for parts of the transmission 200, which are the same as the parts of the transmission 100 according to the first embodiment, reference numerals have been used which are increased by 100 compared to the first embodiment. The description of the corresponding parts in connection with the first embodiment is hereby referred to in particular.

Like the transmission 100, the transmission 200 with a power take-off drive has an input clutch section 202, a power take-off drive adapter 204 and a shift transmission section 206, again with an input housing section 208, an adapter housing section 210 and a shift transmission housing section 212. The input housing section 208 is connected to a drive motor (not shown) by means of a clutch housing flange 214 in such a manner that an input shaft 216 of the transmission 200 is connected to the flywheel of the drive motor. A transmission input clutch 218 and an intermediate shaft 220 are again arranged downstream of the input shaft. The intermediate shaft 220, which engages the transmission input clutch 218, extends through the input section 202 and the adapter 204 into the shift transmission section 206, in which an intermediate clutch 220 is arranged. The intermediate shaft 220 can be connected to a shift transmission shaft 224 by means of the intermediate clutch 222. In addition to the shift transmission shaft 224, the shift transmission part 206 of the transmission 200 also has a countershaft 226 and a range group 228, which are designed in a conventional manner.

As with the first embodiment, the auxiliary drive adapter 204 serves for the transmission of power to a power take-off drive shaft 230, which is offset laterally as with the first embodiment and preferably arranged inclined by 3° to the previously mentioned shafts.

A gear drive with an input gear 232, an intermediate gear 234 and an output gear 236 is again provided for the drive of the power take-off drive shaft 230, wherein the gears 232, 234, 236 are arranged and mounted like in the first embodiment.

In contrast to the first embodiment, the input gear 232 however is supported on a hollow shaft 238, which can not only be connected via a power take-off drive clutch 240 formed as a jaw clutch to the intermediate shaft 220, but the hollow shaft 238 can furthermore be connected to an input clutch auxiliary shaft 246 in a torque-proof manner by means of an independent clutch 244. The input clutch auxiliary shaft 246 is preferably a hollow shaft, which is connected to the input shaft 216 in a rotationally fixed manner.

If an additional assembly is to be driven by the transmission 200 via the power take-off drive shaft 230 shown in FIG. 2, according to the second preferred embodiment, the transmission input clutch 218 is first disengaged with the intermediate clutch 222 also being disengaged, whereby the intermediate shaft 220 is disconnected from the motor and from the transmission. As with the first embodiment, the intermediate shaft 220 can be brought to standstill by means of a countershaft brake 242. In this state, a rotationally rigid connection of the hollow shaft 238 to the intermediate shaft 220 can be established by closing the auxiliary drive clutch 240, which is a start-up jaw clutch. The transmission input clutch 218 is subsequently engaged, whereby a torque flow is established to the power take-off drive shaft 230 from the input shaft 216 via the transmission input clutch 218, the auxiliary drive clutch 240, the hollow shaft 238, and the gear drive 232, 234, 236.

In the previously mentioned state, the hollow shaft 238 and the input clutch auxiliary shaft 246 rotate jointly. This permits the engagement of the independent clutch 244, whereby the torque flow then also takes place via the input clutch auxiliary shaft 246 and the hollow shaft 238. In this state, the start-up jaw clutch of the power take-off drive clutch 240 can then be disengaged, and the transmission input clutch 218 can also be disengaged. The power take-off drive shaft 230 is now operated independently of the transmission input clutch 218, which is now available for use in the vehicle drive operation, in which a cooperation of the transmission input clutch 218 with the shift transmission section 206 is required.

The invention and especially the first preferred embodiment of the transmission 100 offer numerous advantages. It is for example possible to provide a series of transmissions in a modular manner, by providing one or several input clutch sections, one or several shift transmission sections and optionally one or several power take-off drive adapters which can be connected to each other. With the arrangement disclosed, only a few simple clutches and shafts are needed in addition to a transmission input clutch which all can be standardized. An elaborate synchronizing clutch; in particular multi-disk clutch for the power take-off drive is not needed. An additional hydraulic operating unit is then also no longer necessary.

It is further easily possible to arrange the power take-off drive shaft at a desired distance and a desired angle position relative to the input shaft. The production costs are reduced and it is possible to provide a higher power output at the power take-off drive without any loss in performance as it might occur with a separate multidisc clutch for the power take-off drive. It is also advantageous that the power take-off drive could be engaged under a full load.

The particularly preferred second embodiment furthermore offers the possibility to arrange a hydrostatic infinitely variable transmission at the power take-off drive.

What is claimed is:

1. A transmission with a power take-off drive, including a housing (108, 110, 112), an input shaft (116; 216), an intermediate shaft (120; 220), a shift transmission shaft (124; 224), a power take-off drive shaft (130; 230), a transmission input friction clutch (118; 218), an intermediate clutch (122; 222) and an auxiliary drive clutch (140; 240), wherein the intermediate shaft (120; 220) can be connected to the input shaft (116; 216) via the transmission input clutch (118; 218), wherein the shift transmission shaft (124; 224) can be connected to the intermediate shaft (120; 220) via the intermediate clutch (122; 222), wherein the auxiliary drive clutch (140; 240) is arranged in the torque flow downstream of the transmission input clutch (118; 218), and wherein the auxiliary drive clutch (140, 240) is in the form of a jaw clutch, by means of which hollow shaft (138, 238), which is rotatably supported by the housing (108, 110, 112) and through which the intermediate shaft (120, 220) extends, can be directly connected to the intermediate shaft (120, 220), the hollow shaft (138, 238) carrying an input element (132, 232) of the power take-off drive for rotation with the hollow shaft 138, 238).

2. The transmission according to claim 1, wherein only one clutch, which is designed as an independent jaw clutch (244), is provided, by means of which it is possible to disengage the transmission input clutch (218) and the intermediate shaft (220) from the load of the power take-off drive after starting the power take-off drive, the independent jaw clutch (244) cooperating with an input clutch auxiliary shaft (246).

3. The transmission according to claim 1, wherein the auxiliary drive clutch (140, 240) is a three-position jaw clutch, in which the functions of a transmission jaw clutch and an independent jaw clutch (244) are combined, so that, by means of the independent jaw clutch (244) it is possible to disconnect the friction input clutch (218) and the intermediate shaft (220) from the power take-off drive after starting the power take-off drive and connect the intermediate shaft (220) to the drive transmission whereby the friction input clutch (218) is then available for the operation of a vehicle.

* * * * *